May 23, 1967 L. V. RAMONEDA ETAL 3,321,052
BRAKING SYSTEM
Filed June 13, 1966 2 Sheets-Sheet 2

INVENTORS
LOUIS V. RAMONEDA
RICHARD F. MESTAYER, JR.

BY
Scrivener Parker Scrivener & Clarke
ATTORNEYS

United States Patent Office 3,321,052
Patented May 23, 1967

3,321,052
BRAKING SYSTEM
Louis V. Ramoneda, 2116 St. Denis, and Richard F. Mestayer, Jr., 1533 Lafitte Ave., both of New Orleans, La. 70112
Filed June 13, 1966, Ser. No. 557,196
1 Claim. (Cl. 188—152)

This invention relates broadly to a device, such as a brake, for stopping the rotation of a body such as a wheel, drum, shaft or the like, and while the invention is of general application in retarding or stopping the rotation of any rotating body it has particular application to each wheel of an automotive vehicle in order, when actuated, to slow down or stop movement of the vehicle.

The usual braking devices, particularly those used with automotive vehicles, rely on friction for their retarding or stopping effect. This friction generates heat and in some cases, as when the vehicle is traveling at a high rate of speed and must be stopped in a short time or distance, considerable amounts of heat are developed. This generated heat is the cause of many disadvantages, requiring as it does costly apparatus to dissipate the heat, and producing as it does serious metallurgical effects in the metal and other parts which are subjected to it. It is accordingly apparent, and is well known to those skilled in the arts of retarding and stopping movement, that considerable advantages would be inherent in any braking system not dependent for its operation on the production of friction and its attendant heat. It has accordingly been the principal object of this invention to provide apparatus for retarding or stopping rotary movement, such as that of a wheel of an automotive vehicle, which means are not dependent on the production of friction and in the operation of which only insignificant amounts of heat are generated. In this specification the invention is described as applied to the wheel of a vehicle but it will be understood that it is of general application in retarding or stopping the rotation of any rotating body such as a wheel, drum, shaft or the like.

Figure 1:
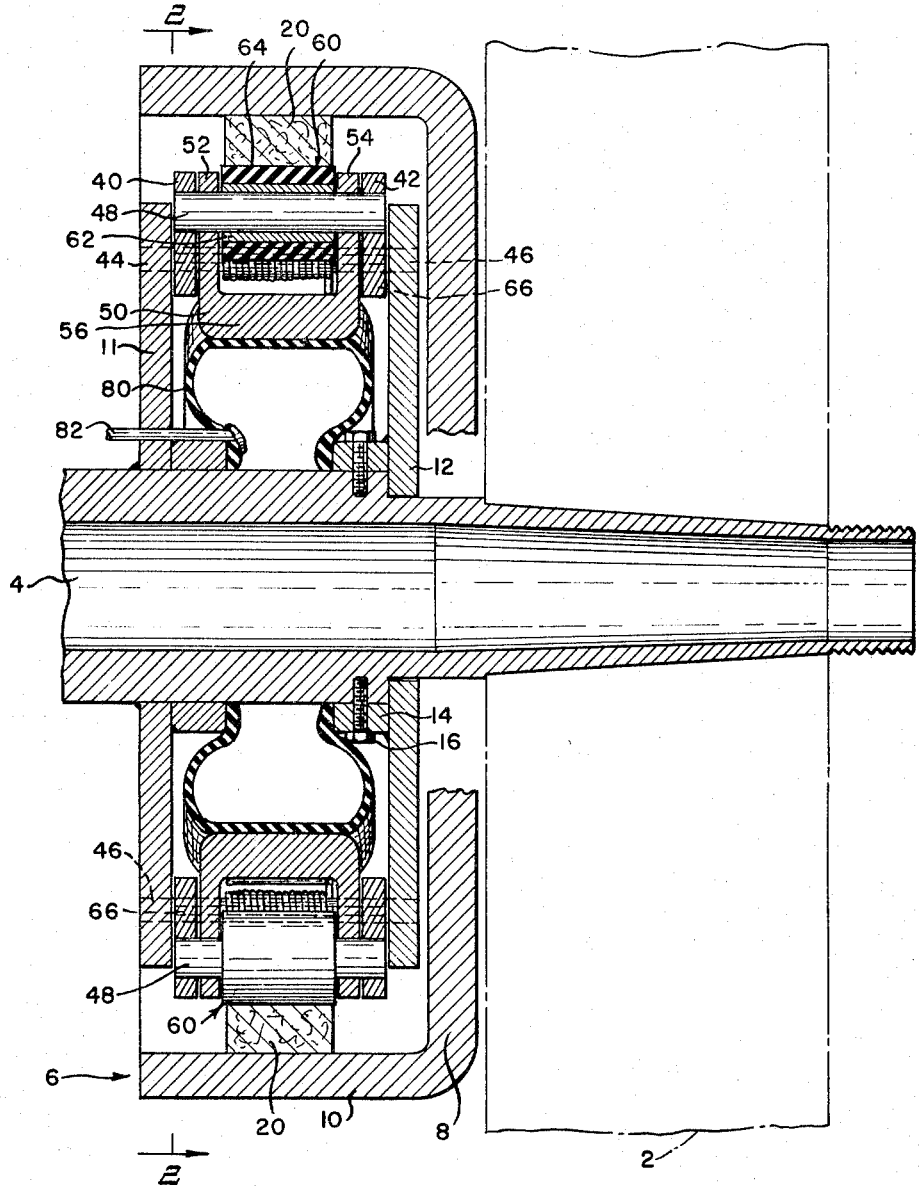
Figure 2:
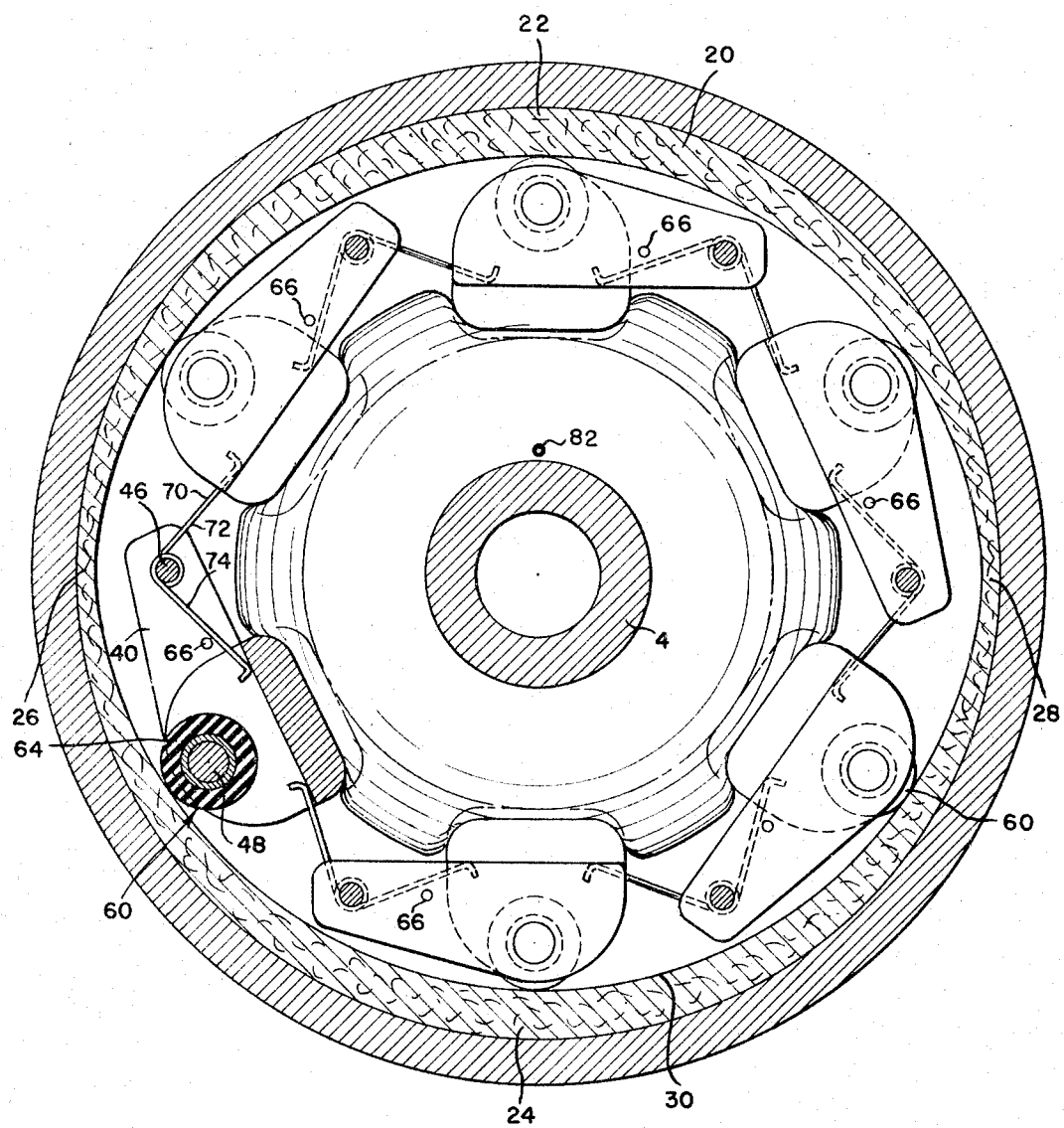

The invention is described in the following specification and is illustrated in the accompanying drawings in which:

FIG. 1 is a sectional view taken diametrically through the means provided by the invention for retarding or stopping rotation of the wheel of a vehicle, and FIG. 2 is a sectional view taken on line 2—2 of FIG. 1, showing more fully the braking apparatus provided by the invention.

The braking apparatus is disclosed in this specification as applied to the wheel 2 of a vehicle which is shown schematically in FIG. 1 and which is mounted on a non-rotating axle housing 4 in any suitable and well known way. A brake drum 6 is connected to wheel 2 and is of usual and conventional shape, having a flat, circular backing member 8 and a cylindrical flange 10, the inner surface of which is of constant distance from the axis of rotation of the wheel and drum. The brake drum is mounted for rotation with the wheel 2 and in accordance with the invention means are associated with the brake drum for retarding or stopping its rotation and that of the wheel.

The braking means provided by the invention comprises two parallel, preferably circular plates 11, 12 which concentrically surround the fixed axle housing 4 and are permanently connected thereto and are positioned within the flange 10 of the brake drum. Plate 11 may be connected to the outer periphery of the axle housing by welding, while plate 12 may be connected to the axle housing by being welded to an annular ring 14 which surrounds the axle housing and is connected thereto by screws 16. The two plates 11, 12 are spaced longitudinally of the axle housing, are non-rotatable, and are positioned within the flange 10 of the brake drum 6.

On the inner surface of the flange 10 of the brake drum, and extending throughout the entire circumferential length thereof, there is mounted an annular wedge member 20 which may be formed of metal or any suitable material such as that from which brake linings are usually made. This wedge member is of varying radial thickness throughout its length, having two diametrically spaced parts of maximum thickness, which are indicated at 22, 24 in FIG. 2, and two diametrically spaced parts 26, 28 of minimum thickness which are displaced 90° with respect to the parts of maximum thickness. As clearly shown in FIG. 2 these parts of maximum and minimum thickness form parts of a continuous inner surface 30 having no abrupt points or areas of changing radius. It will be seen that the wedge member 20 with its continuous surface 30 of varying distance from the axis of rotation of the drum, rotates with the drum and the wheel 2 and rotates with respect to the fixed plates 11, 12 which are positioned within the drum.

Means are provided by the invention for movement into the path of movement of the parts of the continuous inner surface 30 of the wedge member which are of minimum radial distance from the axis of rotation of the wheel and drum, for the purpose of retarding rotation of the wedge member and its associated rotating parts without the development of friction or heat due to friction. These means comprise a plurality of retarding members mounted in a circular arrangement interiorly of the drum and in proximity to the continuous inner surface 30 of the wedge member 20. Any number of these devices may be provided, six being shown in the drawings, and it is believed that a description of one of them will suffice as all are of identical construction and arrangement. Each of these devices comprises, first, two spaced, parallel hinge members 40, 42 which are generally elongated in a direction circumferential of the drum and are spaced axially of the axle housing within the drum and are, respectively, in close proximity to the inner faces of the two parallel plates 11, 12 which are fixed to the non-rotating axle housing 4. The two hinge members are supported in this position by two aligned pivot pins 44, 46 which, respectively, extend through one of the plates 11, 12 and the adjacent hinge member, as most clearly shown in FIG. 1. The pivot pins 44, 46 are positioned adjacent one end of each pair of hinge members whereby the other ends of the hinge members will have a considerable degree of radial motion about the pivots provided by the aligned pins. These other, radially movable, ends of the hinge members support a shaft 48 which is parallel to the axis of rotation of the annular member 20, and between the hinge members 40, 42 there is mounted on this shaft a shoe member 50 which is of U shape with its spaced parallel legs 52, 54 extending radially outwardly and with its connecting member 56 positioned radially inwardly of the shaft 48 and spaced radially outwardly from the outer periphery of axle housing 4. A roller 60 is mounted on shaft 48 between the legs 52, 54 of the shoe 50 and is supported on the shaft by bushing 62 which is formed of low friction material, although ball or roller bearings may be used. The outer surface 64 of the roller is preferably formed of a material such as rubber. A pin 66 is mounted on each hinge member between pivot pin 46 and the shoe carried by the hinge members, and the end of each of these pins protrudes into the path of movement of the shoe to prevent any excessive rocking movement of the shoe in the direction of rotation of the wheel and drum. A torsion spring 70 is mounted on each pin 46 and has two end parts 72, 74 which respectively engage the interior surfaces of the bottoms 56 of the two shoes on opposite sides of the pin and constantly urge these shoes radially inwardly to a normal position in which the rollers 60 are out of contact with the continuous inner surface 30 of the wedge member 20. Each of the retarding members has the structure described above and as these members are mounted in a circular arrangement within the drum and within the annular wedge member 20, with the radially inner surface of each shoe 56 spaced radially outwardly from the outer periphery of axle housing 4, the inner surfaces of the shoes are disposed in a circle which is spaced radially outwardly from the outer surface of the axle housing.

Means are provided by the invention for moving the shoes and their associated rollers and hinge members radially outwardly into any desired degree of engagement with the continuous inner surface 30 of the annular wedge member 20. Such means preferably comprise an inflatable member 80 of toroidal shape which surrounds the axle housing between the side plates 11, 12 and the outer radial surface of which engages the inner radial surfaces of the shoes 50. An inlet tube 82 leads to the interior of this inflatable member and means, which are not shown in the drawings, are provided for introducing compressed air under any desired degree of pressure into the interior of the inflatable member.

In the operation of the apparatus provided by the invention it will be assumed that the wheel 2, drum 10 and wedge member 20 are rotating, the other members described above being fixed from rotation, and that it is desired to retard or stop such rotation. Before application of the braking means the inflatable member 80 is either not inflated at all or is not inflated sufficiently to overcome the action of the springs 70 sufficiently to move the rollers 60 into the path of movement of any part of the inner surface of the annular wedge member 20. At this time the springs urge each shoe 50 radially inwardly about its pivot pin 46 to a position in which the roller 60 which is carried by the shoe is removed from any contact with the inner surface 30 of wedge member 20, which means that they are not in contact with the parts 22, 24 of maximum thickness of the wedge member as that member rotates with the drum. If it is now desired to retard or stop rotation of the wheel and its associated rotating parts, compressed air is introduced into the inflatable member 80 through inlet tube 82 thereby inflating the member and forcing it radially outwardly against the shoes 50, thus moving the shoes and the hinge members 40, 42 outwardly about the pivot pins 46 and thereby moving the rollers 62 radially outwardly into the path of movement of those parts of the continuous inner surface 30 of the wedge member 20 which are of least distance from the axis of rotation of the wheel and drum, such outward movement being effected against the force of springs 70. The degree of inflation of member 80 will determine the amount of outward radial movement of the rollers 60, and the radially outermost parts of the outer surfaces of these rollers will therefore lie in a circular path of fixed radius, radial inward movement of the rollers being resisted by the fluid pressure within member 80. This fixed circular path described by the radially outermost parts of the rollers 60 will lie in the path of rotation of the highest parts of the wedge member and as these parts progressively pass the rollers the rotation of the wedge member, the drum and the wheel will be retarded by the necessity of the highest parts of the wedge member to be forced past the rollers. It will be apparent that as the higher parts of the wedge member pass over each roller the roller and its associated shoe will be forced radially inwardly, compressing the inflated toroidal member 80, and that the force required to effect such compression will be a function of the pressure within the toroid.

Obviously, a slight retarding effect may be accomplished by inflating member 80 to a lesser degree, while a full stop may be accomplished by greater inflation. As the rollers 60 are free to rotate on their axles 48, friction between the surfaces of the rollers and the inner surface 30 of the wedge member is reduced to an absolute minimum and, in fact, has been found to be negligible as a source of heat. The minimum heat produced on operation of the braking device is further reduced by proper selection of the materials of the roller coverings and the wedge member.

In the preferred form of the invention an inflatable toroidal shaped member 80 is provided to move the shoes and their associated rollers, and such inflation is accomplished with the use of compressed air. It is within the scope of the invention, however, to provide other means than an inflatable toroid for moving the shoes and rollers and this may be accomplished, if desired, by cams, piston and cylinder systems, and the like without departing from the invention. Further, a hydraulic fluid may be used instead of compressed air but will not have the advantage of compressibility which is inherent in the compressed air.

While we have described and illustrated one form of our invention, it will be apparent to those skilled in the arts to which it relates that other embodiments, as well as that disclosed, may be made and practiced without departing in any way from the spirit or scope of the invention, for the limits of which reference must be made to the appended claim.

What is claimed is:

A braking device for a rotating body, comprising an annular member connected to the body for rotation therewith and having a continuous inner surface of varying distance from the axis of rotation of the body, a plurality of hinge members each pivotally mounted within said annular member and each having a part movable toward and away from said annular member about its pivotal support, a shoe member carried by each hinge member and movable toward and away from said annular member as the hinge member moves about its pivotal support, a roller carried by each shoe member and positioned adjacent the inner surface of said annular member on an axis parallel to that of the annular member, means normally urging each hinge member and its associated shoe and roller to a position in which the roller is out of contact with the inner surface of said annular member, and an inflatable toroidal shaped member having its peripheral wall in engagement with said shoe members whereby upon inflation thereof the shoe and hinge members will be moved about their pivotal supports to move the rollers into the path of movement of the inner surface of said annular member, and means for inflating said toroidal shaped member.

References Cited by the Examiner

UNITED STATES PATENTS

| | | | |
|---|---|---|---|
| 1,854,067 | 4/1932 | Roth | 188—91 |
| 1,923,115 | 8/1933 | Rash et al. | 188—90 |
| 2,194,853 | 3/1940 | Hatch et al. | 188—152 |
| 2,406,543 | 8/1946 | Hunter | 188—152 |

MILTON BUCHLER, *Primary Examiner.*

G. E. A. HALVOSA, *Assistant Examiner.*